Aug. 14, 1923.
L. DI CARLO
ROTARY CUTTER
Filed March 24, 1922
1,465,075
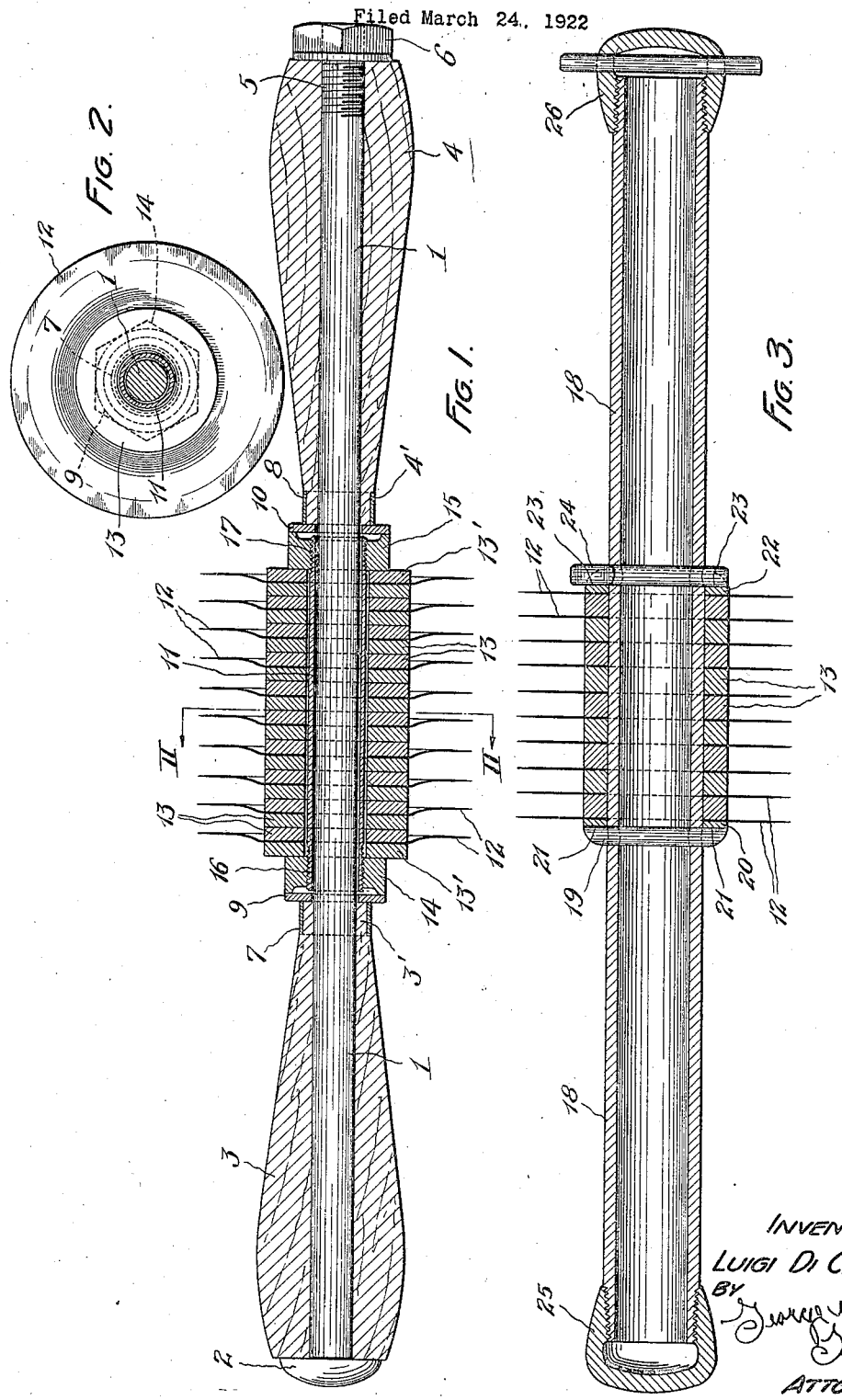
INVENTOR:
LUIGI DI CARLO
BY
ATTORNEY.

Patented Aug. 14, 1923.

1,465,075

UNITED STATES PATENT OFFICE.

LUIGI DI CARLO, OF LOCKPORT, NEW YORK.

ROTARY CUTTER.

Application filed March 24, 1922. Serial No. 546,392.

*To all whom it may concern:*

Be it known that I, LUIGI DI CARLO, a subject of the King of Italy, resident of Lockport, county of Niagara, and State of New York, have invented new and useful Improvements in Rotary Cutters, of which the following is a specification, the principle of the invention being herein explained, and the best mode in which I have contemplated applying that principle so as to distinguish it from other inventions.

My invention relates to rotary cutters, and particularly to a manually operated device of this character for cutting macaroni. More particularly, the invention relates to a rotary macaroni cutter which is provided with a plurality of knives, so that a plurality of macaroni strips can be cut at one time, means being provided also whereby the width of the macaroni strips can be varied as desired.

The annexed drawing and the following description set forth in detail certain means embodying my invention, the disclosed means, however, constituting but two of the various mechanical forms in which the principle of the invention may be applied.

In said annexed drawing:

Figure 1 represents a longitudinal section of my improved cutter;

Figure 2 represents a transverse section, taken in the plane indicated by the line II—II, Figure 1; and Figure 3 represents a longitudinal section of a modified form of cutter illustrating the principle of my invention.

Referring to the annexed drawing, Figure 1, a suitable cylindrical stem for my improved cutter is indicated by the ordinal 1, the same being formed at one end with a head 2. I provide a pair of grip members or handles 3 and 4, of which the former abuts the head 2 at one end and of which the latter is positioned as desired upon the other end of the cylindrical stem 1 by means of a threaded end portion 5 formed upon the stem 1, and a co-operating nut 6. The grip members 3 and 4 are secured to the stem 1 by a close fit. The inner ends of the handles 3 and 4 are formed with bushing members 3' and 4', respectively, of uniform thickness, the body portions of the handles 3 and 4 being of varying thickness for grip purposes, as plainly shown in the drawing. These inner end portions 3' and 4' of the handles 3 and 4 are incased in metallic ferrules 7 and 8, respectively. Washers 9 and 10 are disposed interiorly of and adjacent to the ferrules 7 and 8 and between these washers, upon the stem 1, is mounted a cutting assembly comprising an inner tubular support 11 rotatably mounted upon the stem 1 and forming a journal for a plurality of alternately arranged knives 12 and knife-spacers or washers 13, the assembly being completed and held in proper relative longitudinal position by means of nuts 14 and 15 engaging externally threaded end portions 16 and 17 of the tubular support 11. The two end washers are indicated by the ordinal 13'. It is evident that any desired number of knives 12 may be utilized and that the same may be variously relatively spaced by means of washers 13 of different thicknesses or by using different numbers of washers 13. The knives 12 and washers 13 are locked against relative longitudinal movement by means of the proper adjustment of the nuts 14 and 15, the whole assembly in turn being securely held between the ferrules 7 and 8 by means of the proper adjustment of the handle 4 upon the stem 1 which is made possible by the adjustment of the nut 6 upon the threaded portion 5 of the stem 1. The cutter is thus formed for double hand operation and can be extended or contracted, within reasonable limits, in so far as its over-all cutting dimensions are concerned. The whole knife assembly is rotatable upon the stem 1 and the knives 12 are independently rotatable.

In the form of cutter illustrated by Fig. 3, the main stem consists of a tubular cylindrical member 18, the same being of a diameter considerably greater than that of the diameter of the stem 1, Fig. 1, said stem 18, being, however, of a practicable light weight because of its tubular form. In this form of cutter I dispense with the tubular support 11 and mount the cutters 12 directly upon the stem 18, spacing the same the desired distances by means of washers 13 of suitable thickness. The cutting assembly is fixed longitudinally by means of a pin 19, which is fixed transversely of the stem 18 and engages slots 21 formed in the washer 20, and a washer 22 at the other end of the cutting assembly which is formed with slots 23 adapted to receive a cotter pin 24 transversely intersecting the stem 18. In this form of cutter, the grip or handle retaining members are formed by caps 25 and 26, of which the cap 25 is rigidly secured to one end of the stem 18 and the cap 26 is removably secured to the other end of the stem 18 by means of having screw-threaded engagement therewith, so that said cap 26 can be detached to allow for the placing or removal of the cutting assembly.

What I claim is:

1. In a rotary cutter, the combination of a cylindrical stem; grip members secured to said stem adjacent the ends thereof; a tubular knife support mounted upon said stem intermediate said grip members; a plurality of disk knives mounted upon said support; means for fixing the knives longitudinally relative to each other; and means for spacing adjacent knives.

2. In a rotary cutter, the combination of a cylindrical stem; grip members secured to said stem adjacent the ends thereof; a tubular knife support mounted upon said stem intermediate said grip members, said support having externally-threaded end portions; a plurality of disk knives mounted upon said support; means for spacing adjacent knives; and nuts engaging said threaded support-portions, and adjacent washers, for fixing the knives longitudinally relative to each other.

3. In a rotary cutter, the combination of a cylindrical stem having grip members; a cutting assembly mounted upon said stem intermediate said members, and comprising an inner tubular support formed with externally-threaded end portions, nuts engaging said portions, washers adjacent the inner faces of said nuts, and disk knives and alternate knife-spacing washers intermediate said first-mentioned washers; and other washers spacing the outer faces of said nuts and the inner ends of said grip members.

4. In a rotary cutter, the combination of a cylindrical stem; grip members secured to said stem adjacent the ends thereof, one of said members being longitudinally adjustable upon said stem and being formed with an inner-end metallic-incased bushing portion of uniform thickness; a tubular knife support mounted upon said stem intermediate said grip members; a plurality of disk knives mounted upon said support; means for fixing the knives longitudinally relative to each other; and means for variously spacing adjacent knives.

Signed by me this 16th day of March, 1922.

LUIGI DI CARLO.